United States Patent
Shrivastava

(10) Patent No.: US 10,776,926 B2
(45) Date of Patent: Sep. 15, 2020

(54) SYSTEM AND METHOD FOR TRAINING OBJECT CLASSIFIER BY MACHINE LEARNING

(71) Applicant: Avigilon Corporation, Vancouver (CA)

(72) Inventor: Ashish Shrivastava, Woburn, MA (US)

(73) Assignee: Avigilon Corporation, Vancouver (CA)

( * ) Notice: Subject to any disclaimer, the term of this patent is extended or adjusted under 35 U.S.C. 154(b) by 0 days.

(21) Appl. No.: 15/458,353

(22) Filed: Mar. 14, 2017

(65) Prior Publication Data
US 2017/0270674 A1    Sep. 21, 2017

Related U.S. Application Data

(60) Provisional application No. 62/309,777, filed on Mar. 17, 2016.

(51) Int. Cl.
| G06K 9/00 | (2006.01) |
| G06T 7/194 | (2017.01) |
| G06K 9/62 | (2006.01) |
| G06N 20/00 | (2019.01) |
| G06T 11/60 | (2006.01) |

(52) U.S. Cl.
CPC .......... *G06T 7/194* (2017.01); *G06K 9/00771* (2013.01); *G06K 9/6227* (2013.01); *G06K 9/6256* (2013.01); *G06N 20/00* (2019.01); *G06T 11/60* (2013.01); *G06T 2207/20081* (2013.01); *G06T 2210/22* (2013.01)

(58) Field of Classification Search
None
See application file for complete search history.

(56) References Cited

U.S. PATENT DOCUMENTS

| 7,639,869 | B1 | 12/2009 | Brandt | |
| 7,676,081 | B2 | 3/2010 | Blake et al. | |
| 2004/0246336 | A1 | 12/2004 | Kelly, III et al. | |
| 2006/0126930 | A1* | 6/2006 | Kondo | H04N 5/213 382/155 |
| 2009/0161962 | A1* | 6/2009 | Gallagher | G06K 9/6211 382/203 |
| 2013/0162867 | A1 | 6/2013 | Gupta et al. | |
| 2015/0054824 | A1* | 2/2015 | Jiang | G06K 9/6284 345/420 |
| 2015/0278616 | A1 | 10/2015 | Li et al. | |
| 2016/0070986 | A1* | 3/2016 | Chidlovskii | G06K 9/00785 382/104 |

FOREIGN PATENT DOCUMENTS

EP    2 955 645 A1    12/2015

OTHER PUBLICATIONS

International Search Report and Written Opinion dated Jun. 22, 2017, issued by the Canadian Intellectual Property Office in corresponding Patent Cooperation Treaty Application No. PCT/CA2017/050334, filed Mar. 14, 2017.

* cited by examiner

*Primary Examiner* — Sean M Conner
(74) *Attorney, Agent, or Firm* — Daniel Hammond

(57) ABSTRACT

A system and method for training a computer-implemented object classifier includes detecting a foreground visual object within a sub-region of a scene, determining a background model of the sub-region of the scene, the background model representing the sub-region when any foreground visual object is absent from that sub-region, and training the object classifier by computer-implemented machine learning using the background model of the sub-region as a negative training example.

17 Claims, 13 Drawing Sheets

SYSTEM AND METHOD FOR TRAINING OBJECT CLASSIFIER BY MACHINE LEARNING

CROSS REFERENCE TO RELATED APPLICATIONS

This application claims the benefit of U.S. Provisional Application Ser. No. 62/309,777, entitled SYSTEM AND METHOD FOR TRAINING OBJECT CLASSIFIER BY MACHINE LEARNING, filed on Mar. 17, 2016, which is incorporated by reference herein.

FIELD

The present subject-matter relates to classification of visual objects, and more particularly to training a computer-implemented object classifier using background models of detected foreground visual objects as negative training examples.

BACKGROUND

Computer implemented visual object classification, also called object recognition, pertain to the classifying of visual representations of real-life objects found in still images or motion videos captured by a camera. By performing visual object classification, each visual object found in the still images or motion video is classified according to its type (e.g. human, vehicle, animal).

Automated security and surveillance systems typically employ video cameras or other image capturing devices or sensors to collect image data. In the simplest systems, images represented by the image data are displayed for contemporaneous screening by security personnel and/or recorded for later reference after a security breach. In those systems, the task of detecting and classifying visual objects of interest is performed by a human observer. A significant advance occurs when the system itself is able to perform object detection and classification, either partly or completely.

In a typical surveillance system, for example, one may be interested in detecting objects such as humans, vehicles, animals, etc. that move through the environment. Different objects might pose different threats or levels of alarm. For example, an animal in the scene may be normal, but a human or vehicle in the scene may be cause for an alarm and may require the immediate attention of a security guard. Automated computer-implemented detection and classification of objects in the images represented by the image data captured by the cameras can significantly facilitate the task of screening of the security personnel as well as improving recording of image data.

SUMMARY

The embodiments described herein provide in one aspect, a method for training a computer-implemented object classifier. The method includes detecting a foreground visual object within a sub-region of a scene, determining a background model of the sub-region of the scene, the background model representing the sub-region when any foreground visual object is absent therefrom and training the object classifier by computer-implemented machine learning using the background model of the sub-region as a negative training example.

The embodiments described herein provide in another aspect a computer-implemented object classifier. The system includes a processor, a computer-readable storage device storing program instructions that, when executed by the processor, cause the system to perform operations that include detecting a foreground visual object within a sub-region of a scene, determining a background model of the sub-region of the scene, the background model representing the sub-region when any foreground visual object is absent therefrom, and training the object classifier by computer-implemented machine learning using the background model of the sub-region as a negative training example.

According to some example embodiments, the methods and/or systems further include training the object classifier by machine learning using the detected foreground visual object as a positive training example.

According to some example embodiments, determining the background model of the sub-region of the scene includes selecting a historical image frame captured when any foreground object is absent from a sub-region of the historical image frame corresponding to the sub-region of the scene and cropping from the historical image frame the sub-region corresponding to the sub-region of the scene, the cropped image frame being the background model of the sub-region of the scene.

According to some example embodiments, determining the background model of the sub-region of the scene includes determining, within each of a plurality of historical image frames, one or more sub-regions being free of any foreground objects, aggregating the one or more sub-regions from the plurality of historical image frames to form a complete background image representing the entire scene, and cropping from the complete background image a sub-region corresponding to the sub-region of the scene, the cropped complete background image being the background model of the sub-region of the scene.

According to some example embodiments, aggregating the one or more sub-regions from the plurality of historical image frames comprises stitching the one or more sub-regions to form an image representing the whole scene.

According to some example embodiments, the object classifier is trained specifically for a current scene.

According to some example embodiments, upon the current scene being changed to a new scene, reverting to the object classifier without the training specific to the current scene and training the object classifier by machine learning using background models from the new scene.

According to some example embodiments, the object classifier is prepared in part using supervised learning.

According to some example embodiments, the computer-implemented machine learning is chosen from convolution neural networks, support vector machines, decision trees, random forests, and cascade classifiers.

According to some example embodiments, the methods and/or systems further include training the object classifier by computer-implemented machine learning using a misclassified sub-region of a scene as a negative training example.

BRIEF DESCRIPTION OF THE DRAWINGS

The detailed description refers to the following figures, in which.

Figure 1A:
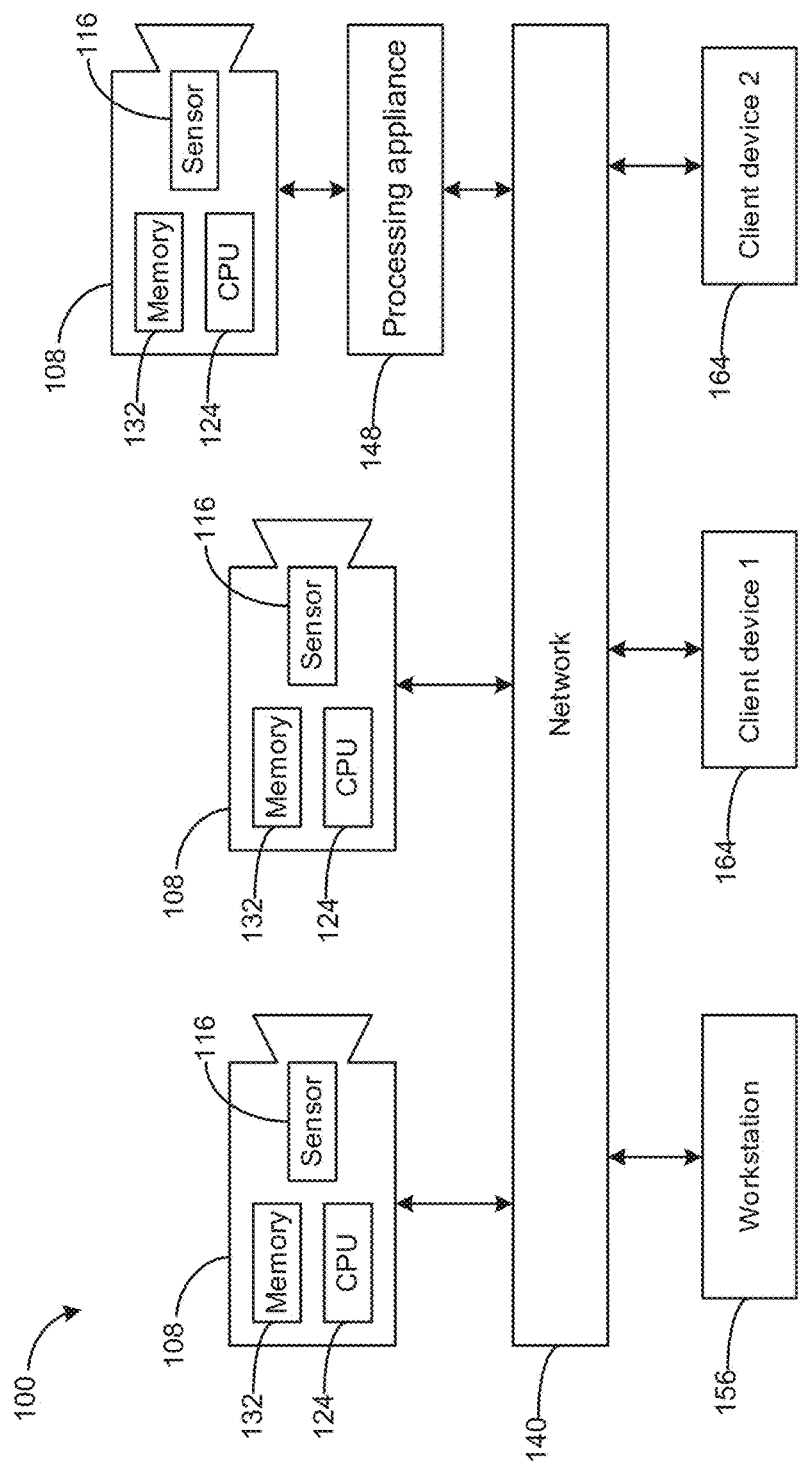
FIG. 1A illustrates a block diagram of connected devices of a video capture and playback system according to an example embodiment.

It will be appreciated that for simplicity and clarity of illustrates, elements shown in the figures have not necessarily been drawn to scale. For example, the dimensions of some of the elements may be exaggerated relative to other elements for clarity. Furthermore, where considered appropriate, reference numerals may be repeated among the figures to indicate corresponding or analogous elements.

DETAILED DESCRIPTION OF VARIOUS EMBODIMENTS

Numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise. A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The term "plurality" means "two or more", unless expressly specified otherwise.

The term "herein" means "in the present application, including anything which may be incorporated by reference", unless expressly specified otherwise.

The term "e.g." and like terms mean "for example", and thus do not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The word "a" or "an" when used in conjunction with the term "comprising" or "including" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through one or more intermediate elements or devices via an electrical element, electrical signal or a mechanical element depending on the particular context.

"Image data" herein refers to data produced by a video capture device and that represents images captured by the video capture device. The image data may include a plurality of sequential image frames, which together form a video captured by the video capture device. Each image frame may be represented by a matrix of pixels, each pixel having a pixel image value. For example, the pixel image value may be a numerical value on grayscale (e.g., 0 to 255 ) or a plurality of numerical values for colored images. Examples of color spaces used to represent pixel image values in image data include RGB, YUV, CYKM, YCBCR 4:2:2, and YCBCR 4:2:0 images. It will be understood that "image data" as used herein can refer to "raw" image data produced by the video captured device and/or to image data that has undergone some form of processing.

A "foreground visual object" refers to a visual representation of a real-life object (e.g. person, animal, vehicle) found in the image frames captured by the video capture device. The foreground visual object is one that is of interest for various purposes, such as video surveillance. For example, the foreground visual object being in a scene may represent an event, such as human or vehicle being present. A foreground visual object may be a moving object or a previously moving object. The foreground visual object is distinguished from a background object, which is an object found in the background of a scene and which is not of interest.

A "current image frame" refers to an image frame within the plurality of sequential image frames of a video that is currently being analyzed within various systems and methods described herein. The image data of a current image frame is analyzed to generate information regarding objects captured within the current image frame and/or within a plurality of image frames preceding the current image.

A "previous image frame" or a "historical image frame" of a current image frame refers to an image frame that occurred prior to a current image frame within the plurality of sequential image frames of a video. For example, the previous image frame may be the image frame that immediately preceded the current image frame. Alternatively, the previous image frame may be an earlier image frame of the plurality of sequential image frames, but is sufficiently close to the current image frame so as to be pertinent to the current image frame.

"Processing image data" or variants thereof herein refers to one or more computer-implemented functions performed on image data. For example, processing image data may include, but is not limited to, image processing operations, analyzing, managing, compressing, encoding, storing, transmitting and/or playing back the video data. Analyzing the image data may include segmenting areas of image frames and detecting visual objects, tracking and/or classifying visual objects located within the captured scene represented by the image data. The processing of the image data may cause modified image data to be produced, such as compressed (e.g. lowered quality) and/or re-encoded image data. The processing of the image data may also cause additional information regarding the image data or visual objects captured within the images to be outputted. For example, such additional information is commonly understood as metadata. The metadata may also be used for further processing of the image data, such as drawing bounding boxes around detected visual objects in the image frames.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed aspect(s) are widely applicable to numerous embodiments, as is readily apparent from the disclosure. One of ordinary skill in the art will recognize that the disclosed aspect(s) may be practiced with various modifications and alterations, such as structural and logical modifications. Although particular features of the disclosed aspect(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application is essential or is coextensive, except where it is either expressly stated to be so in this specification or expressly recited in a claim.

As will be appreciated by one skilled in the art, the various example embodiments described herein may be embodied as a method, system, or computer program product. Accordingly, the various example embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, the various example embodiments may take the form of a computer program product on a computer-usable storage medium having computer-usable program code embodied in the medium Any suitable computer-usable or computer readable medium may be utilized. The computer-usable or computer-readable medium may be, for example but not limited to, an electronic, magnetic, optical, electromagnetic, infrared, or semiconductor system, apparatus, device, or propagation medium. In the context of this document, a computer-usable or computer-readable medium may be any medium that can contain, store, communicate, propagate, or transport the program for use by or in connection with the instruction execution system, apparatus, or device.

Computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or entirely on the remote computer or server. In the latter scenario, the remote computer may be connected to the computer through a local area network (LAN) or a wide area network (WAN), or the connection may be made to an external computer (for example, through the Internet using an Internet Service Provider).

Various example embodiments are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring now to FIG. 1A, therein illustrated is a block diagram of connected devices of the video capture and playback system 100 according to an example embodiment. For example, the video capture and playback system 100 may be used as a video surveillance system. The video capture and playback system 100 includes hardware and software that perform the processes and functions described herein.

The video capture and playback system 100 includes at least one video capture device 108 being operable to capture a plurality of images and produce image data representing the plurality of captured images.

Each video capture device 108 includes at least one image sensor 116 for capturing a plurality of images. The video capture device 108 may be a digital video camera and the image sensor 116 may output captured light as a digital data. For example, the image sensor 116 may be a CMOS, NMOS, or CCD.

The at least one image sensor 116 may be operable to capture light in one or more frequency ranges. For example, the at least one image sensor 116 may be operable to capture light in a range that substantially corresponds to the visible light frequency range. In other examples, the at least one image sensor 116 may be operable to capture light outside the visible light range, such as in the infrared and/or ultraviolet range. In other examples, the video capture device 108 may be a multi-sensor camera that includes two or more sensors that are operable to capture light in different frequency ranges.

The at least one video capture device 108 may include a dedicated camera. It will be understood that a dedicated camera herein refers to a camera whose principal features is to capture images or video. In some example embodiments, the dedicated camera may perform functions associated to the captured images or video, such as but not limited to processing the image data produced by it or by another video capture device 108. For example, the dedicated camera may be a surveillance camera, such as any one of a pan-tilt-zoom camera, dome camera, in-ceiling camera, box camera, and bullet camera.

Additionally, or alternatively, the at least one video capture device 108 may include an embedded camera. It will be understood that an embedded camera herein refers to a camera that is embedded within a device that is operational to perform functions that are unrelated to the captured image or video. For example, the embedded camera may be a camera found on any one of a laptop, tablet, drone device, smartphone, video game console or controller.

Each video capture device 108 includes one or more processors 124, one or more memory devices 132 coupled to the processors and one or more network interfaces. The memory device can include a local memory (e.g., a random access memory and a cache memory) employed during execution of program instructions. The processor executes computer program instructions (e.g., an operating system and/or application programs), which can be stored in the memory device.

In various embodiments the processor 124 may be implemented by any processing circuit having one or more circuit units, including a digital signal processor (DSP), graphics processing unit (GPU) embedded processor, etc., and any combination thereof operating independently or in parallel, including possibly operating redundantly. Such processing circuit may be implemented by one or more integrated circuits (IC), including being implemented by a monolithic integrated circuit (MIC), an Application Specific Integrated Circuit (ASIC), a Field Programmable Gate Array (FPGA), etc. or any combination thereof. Additionally or alternatively, such processing circuit may be implemented as a programmable logic controller (PLC), for example. The processor may include circuitry for storing memory, such as digital data, and may comprise the memory circuit or be in wired communication with the memory circuit, for example.

In various example embodiments, the memory device 132 coupled to the processor circuit is operable to store data and computer program instructions. Typically, the memory device is all or part of a digital electronic integrated circuit or formed from a plurality of digital electronic integrated circuits. The memory device may be implemented as Read-Only Memory (ROM), Programmable Read-Only Memory (PROM), Erasable Programmable Read-Only Memory (EPROM), Electrically Erasable Programmable Read-Only Memory (EEPROM), flash memory, one or more flash drives, universal serial bus (USB) connected memory units, magnetic storage, optical storage, magneto-optical storage, etc. or any combination thereof, for example. The memory device may be operable to store memory as volatile memory, non-volatile memory, dynamic memory, etc. or any combination thereof.

In various example embodiments, a plurality of the components of the image capture device 108 may be implemented together within a system on a chip (SOC). For example, the processor 124, the memory device 132 and the network interface may be implemented within a SOC. Furthermore, when implemented in this way, a general purpose processor and one or more of a GPU and a DSP may be implemented together within the SOC.

Continuing with FIG. 1A, each of the at least one video capture device 108 is connected to a network 140. Each video capture device 108 is operable to output image data representing images that it captures and transmit the image data over the network.

It will be understood that the network 140 may be any communications network that provides reception and transmission of data. For example, the network 140 may be a local area network, external network (e.g., WAN, Internet) or a combination thereof. In other examples, the network 140 may include a cloud network.

In some examples, the video capture and playback system 100 includes a processing appliance 148. The processing appliance 148 is operable to process the image data outputted by a video capture device 108. The processing appliance 148 also includes one or more processors and one or more memory devices coupled to a processor. The processing appliance 148 may also include one or more network interfaces.

For example, and as illustrated, the processing appliance 148 is connected to a video capture device 108. The processing appliance 148 may be further connected to the network 140.

According to one exemplary embodiment, and as illustrated in FIG. 1A, the video capture and playback system 100 includes at least one workstation 156 (e.g. server), each having one or more processors. The at least one workstation 156 may also include storage memory. The workstation 156 receives image data from at least one video capture device 108 and performs processing of the image data. The workstation 156 may further send commands for managing and/or controlling one or more of the image capture devices 108. The workstation 156 may receive raw image data from the video capture device 108. Alternatively, or additionally, the workstation 156 may receive image data that has already undergone some intermediate processing, such as processing at the video capture device 108 and/or at a processing appliance 148. The workstation 156 may also receive metadata from the image data and perform further processing of the image data.

It will be understood that while a single workstation 156 is illustrated in FIG. 1A, the workstation may be implemented as an aggregation of a plurality of workstations.

The video capture and playback system 100 further includes at least one client device 164 connected to the network 140. The client device 164 is used by one or more users to interact with the video capture and playback system 100. Accordingly, the client device 164 includes at least one display device and at least one user input device (e.g., mouse, keyboard, touchscreen). The client device 164 is operable to display on its display device a user interface for displaying information, receiving user input, and playing back video. For example, the client device may be any one of a personal computer, laptops, tablet, personal data assistant (PDA), cell phone, smart phone, gaming device, and other mobile device.

The client device 164 is operable to receive image data over the network 140 and is further operable to playback the received image data. A client device 164 may also have functionalities for processing image data. For example, processing functions of a client device 164 may be limited to processing related to the ability to playback the received image data. In other examples, image processing functionalities may be shared between the workstation 156 and one or more client devices 164.

In some examples, the image capture and playback system 100 may be implemented without the workstation 156. Accordingly, image processing functionalities may be wholly performed on the one or more video capture devices 108. Alternatively, the image processing functionalities may be shared amongst two or more of the video capture devices 108, processing appliance 148 and client devices 164.

Figure 1B:
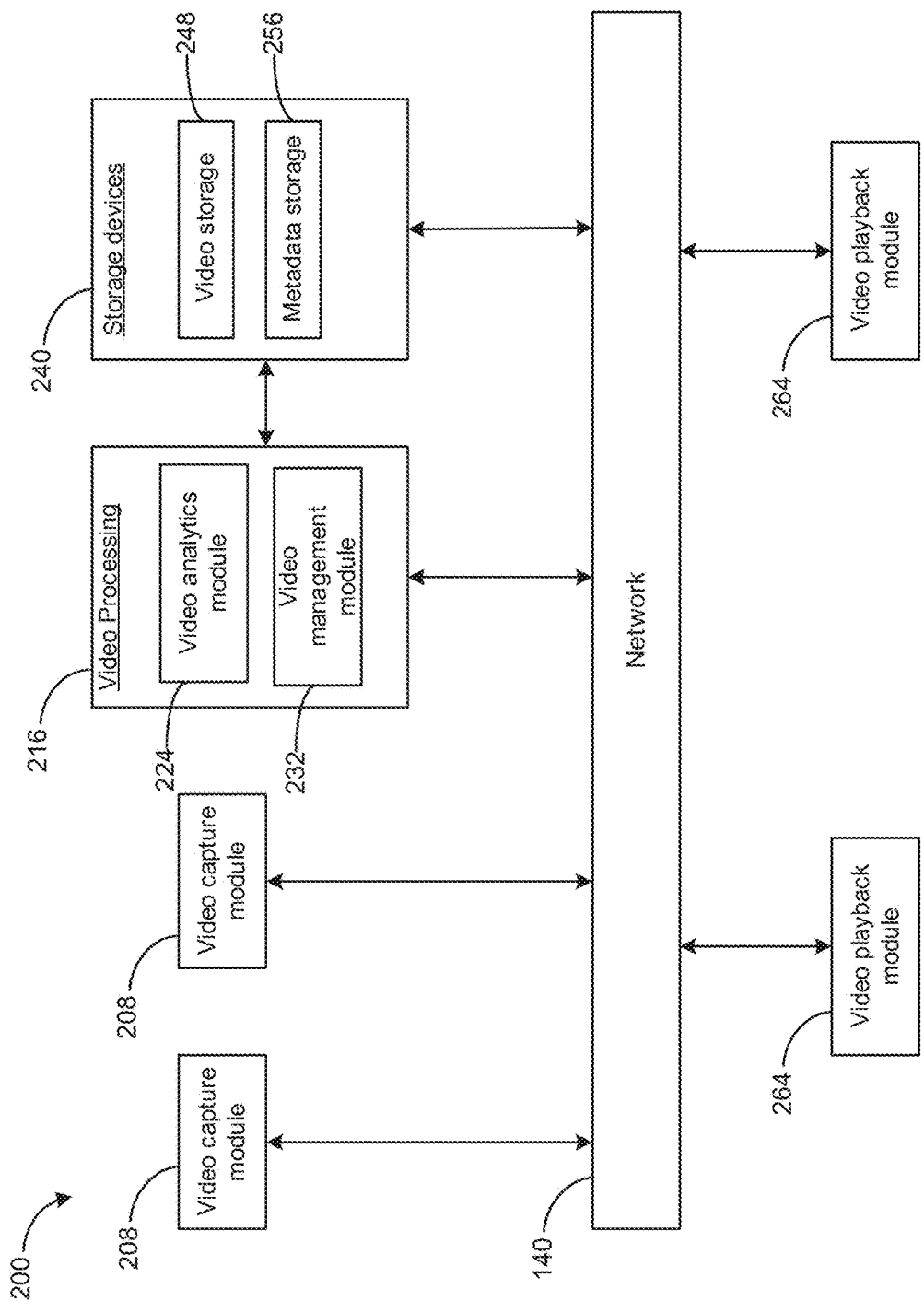
FIG. 1B illustrates a block diagram of a set of operational modules of the video capture and playback system according to one example embodiment.

Referring now to FIG. 1B, therein illustrated is a block diagram of a set 200 of operational modules of the video capture and playback system 100 according to one example embodiment. The operational modules may be implemented in hardware, software or both on one or more of the devices of the video capture and playback system 100 as illustrated in FIG. 1A.

The set 200 of operational modules include at least one video capture module 208. For example, each video capture device 108 may implement a video capture module 208. The video capture module 208 is operable to control one or more components (e.g. sensor 116, etc.) of a video capture device 108 to capture images.

The set 200 of operational modules includes a subset 216 of image data processing modules. For example, and as illustrated, the subset 216 of image data processing modules includes a video analytics module 224 and a video management module 232.

The video analytics module 224 receives image data and analyzes the image data to determine properties or characteristics of the captured image or video and/or of objects found in the scene represented by the image or video. Based on the determinations made, the video analytics module 224 may further output metadata providing information about the determinations. Examples of determinations made by the video analytics module 224 may include one or more of foreground/background segmentation, object detection, object tracking, object classification, virtual tripwire, anomaly detection, facial detection, facial recognition, license plate recognition, identifying objects "left behind", monitoring objects (e.g. to protect from stealing), and business intelligence. However, it will be understood that other video analytics functions known in the art may also be implemented by the video analytics module 224.

The video management module 232 receives image data and performs processing functions on the image data related to video transmission, playback and/or storage. For example, the video management module 232 can process the image data to permit transmission of the image data according to bandwidth requirements and/or capacity. The video management module 232 may also process the image data according to playback capabilities of a client device 164 that will be playing back the video, such as processing power and/or resolution of the display of the client device 164. The video management module 232 may also process the image data according to storage capacity within the video capture and playback system 100 for storing image data.

It will be understood that according to some example embodiments, the subset 216 of video processing modules may include only one of the video analytics module 224 and the video management module 232.

The set 200 of operational modules further include a subset 240 of storage modules. For example, and as illustrated, the subset 240 of storage modules include a video storage module 248 and a metadata storage module 256. The video storage module 248 stores image data, which may be image data processed by the video management module. The metadata storage module 256 stores information data outputted from the video analytics module 224.

It will be understood that while video storage module 248 and metadata storage module 256 are illustrated as separate modules, they may be implemented within a same hardware storage device whereby logical rules are implemented to separate stored video from stored metadata. In other example embodiments, the video storage module 248 and/or the metadata storage module 256 may be implemented within a plurality of hardware storage devices in which a distributed storage scheme may be implemented.

The set of operational modules further includes at least one video playback module 264, which is operable to receive image data and playback the image data as a video. For example, the video playback module 264 may be implemented on a client device 164.

The operational modules of the set 200 may be implemented on one or more of the image capture device 108, processing appliance 148, workstation 156 and client device 164. In some example embodiments, an operational module may be wholly implemented on a single device. For example, video analytics module 224 may be wholly implemented on the workstation 156. Similarly, video management module 232 may be wholly implemented on the workstation 156.

In other example embodiments, some functionalities of an operational module of the set 200 may be partly implemented on a first device while other functionalities of an operational module may be implemented on a second device. For example, video analytics functionalities may be split between one or more of an image capture device 108, processing appliance 148 and workstation 156. Similarly, video management functionalities may be split between one or more of an image capture device 108, processing appliance 148 and workstation 156.

Figure 1C:
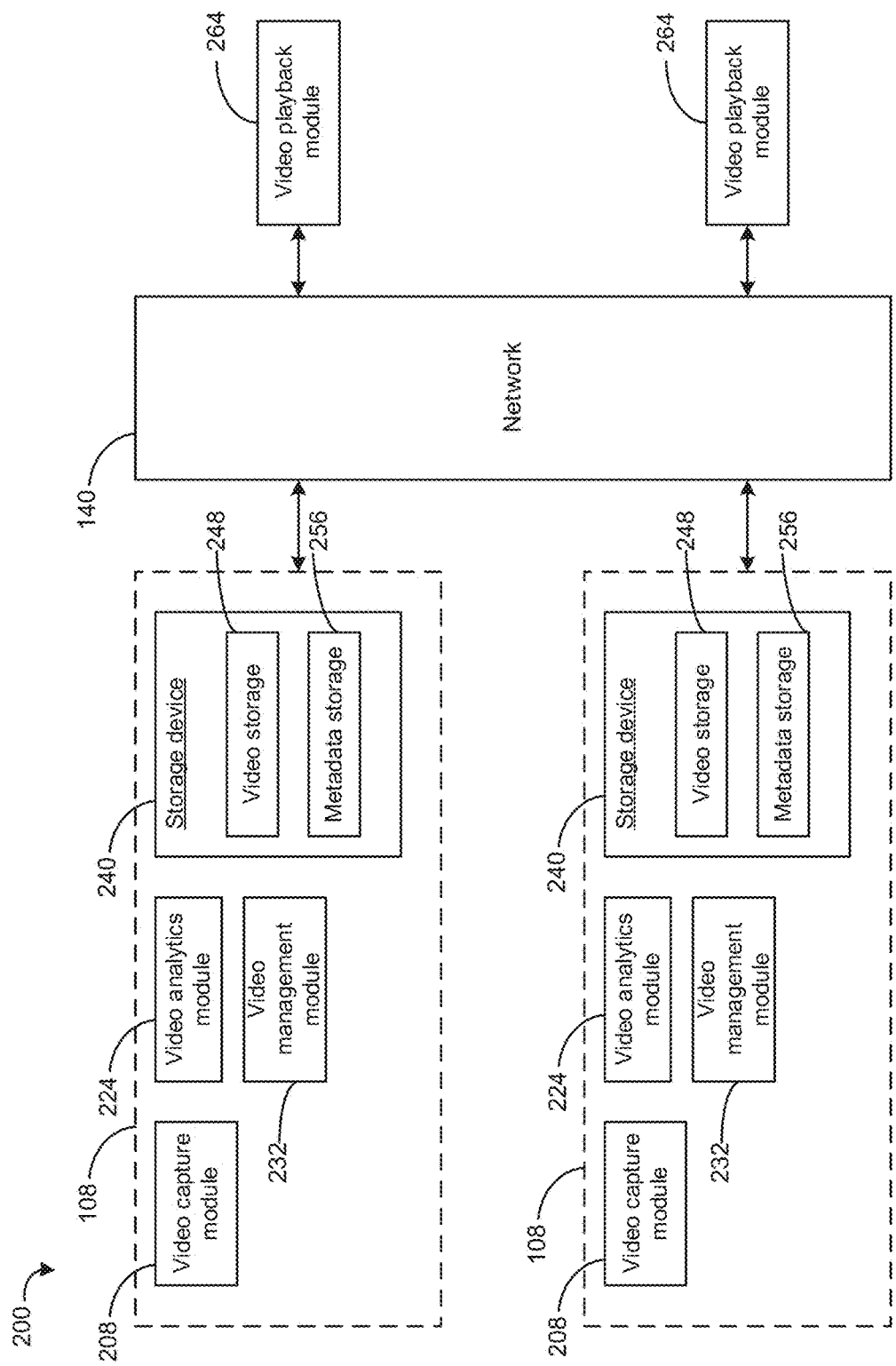
FIG. 1C illustrates a block diagram of a set of operational modules implemented within one device according to one example embodiment.

Referring now to FIG. 1C, therein illustrated is a block diagram of a set 200 of operational modules of the video capture and playback system 100 according to one particular example embodiment wherein the video analytics module 224, the video management module 232 and the storage device 240 is wholly implemented on the one or more image capture devices 108. Accordingly, the video capture and playback system 100 may not require a workstation 156 and/or a processing appliance 148.

It will be appreciated that allowing the subset of image data processing modules to be implemented on a single device or on various devices of the video capture and playback system 100 allows flexibility in building the system 100.

For example, one may choose to use a particular device having certain functionalities with another device lacking those functionalities. This may be useful when integrating devices from different parties (e.g. manufacturers) or retrofitting an existing video capture and playback system.

Figure 2:
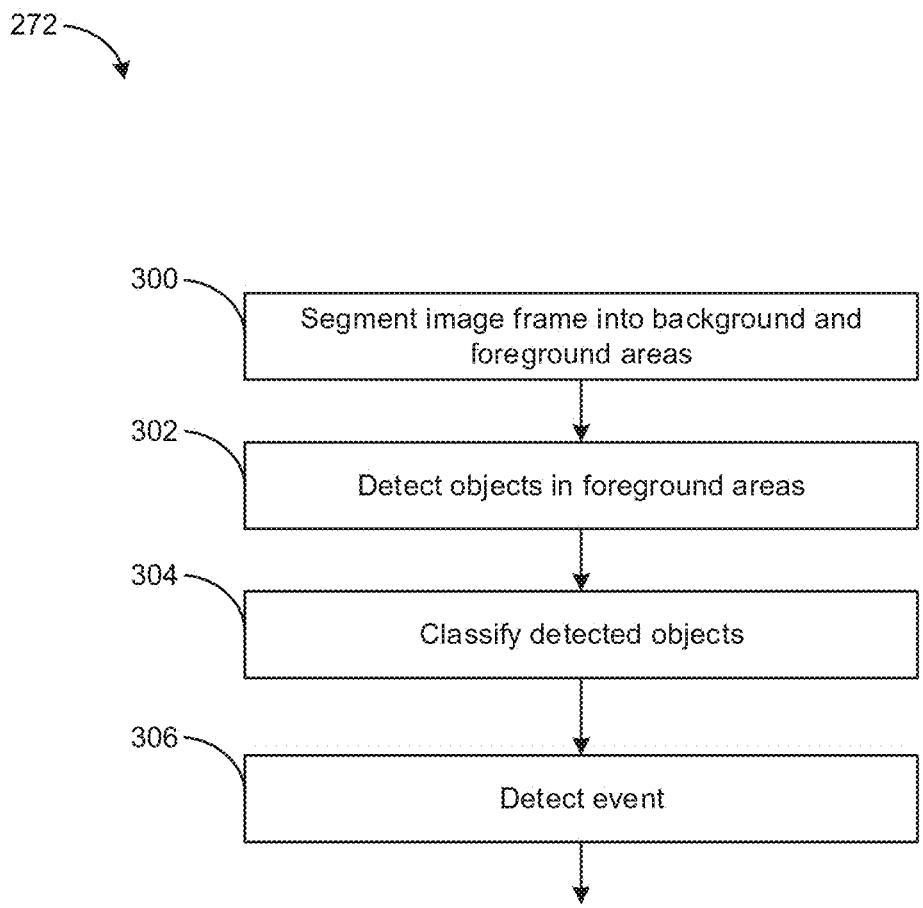
FIG. 2 illustrates a flow chart diagram of an example embodiment of a method for performing video analytics on image data.

Referring now to FIG. 2, therein illustrated is a flow chart diagram of an example embodiment of a method 272 for performing video analytics on one or more image frames of a video captured by a video capture device 108. The video analytics may be performed by the video analytics module 224 to determine properties or characteristics of the captured image or video and/or of visual objects found in the scene captured in the video.

At 300, at least one image frame of the video is segmented into foreground areas and background areas. The segmenting separates areas of the image frame corresponding to moving objects (or previously moving objects) in the captured scene from stationary areas of the scene.

At 302, one or more foreground visual objects in the scene represented by the image frame are detected based on the segmenting of 300. For example, any discrete contiguous foreground area or "blob" may be identified as a foreground visual object in the scene. For example, only contiguous foreground areas greater than a certain size (e.g. number of pixels) are identified as a foreground visual object in the scene.

Metadata may be further generated relating to the detected one or more foreground areas. The metadata may define the location of the foreground visual object within the image frame. For example, the location metadata may be further used to generate a bounding box (e.g. when encoding video or playing back video) outlining the detected foreground visual object.

A visual indicator may be added to the image frame to visually identify each of the detected one or more foreground visual objects. The visual indicator may be a bounding box that surrounds each of the one or more foreground visual objects within the image frame.

According to various example embodiments, video analytics may end with the detecting of objects in the captured scene.

In other example embodiments, the video analytics may further include, at 304, classifying the foreground visual objects detected at 302. For example, pattern recognition may be carried out to classify the foreground visual objects. A foreground visual object may be classified by class, such as a person, a car or an animal. Additionally or alternatively, a visual object may be classified by action, such as movement and direction of movement of the visual object. Other classifiers may also be determined, such as color, size, orientation, etc. In more specific examples, classifying the visual object may include identifying a person based on facial detection and recognizing text, such as a license plate. Visual classification may be performed according to systems and methods described in co-owned U.S. Pat. No. 8,934,709, which is incorporated herein by reference in its entirety.

The video analytics may further include, at 306, detecting whether an event has occurred and the type of event. Detecting the event may be based on a comparison of the classification of one or more foreground visual objects with one or more predefined rules. The event may be an event in anomaly detection or business intelligence, such as whether a video tripwire has been triggered, the number of persons present in one area, whether an object in scene has been "left behind" or whether an object in the scene has been removed.

Figure 3A:
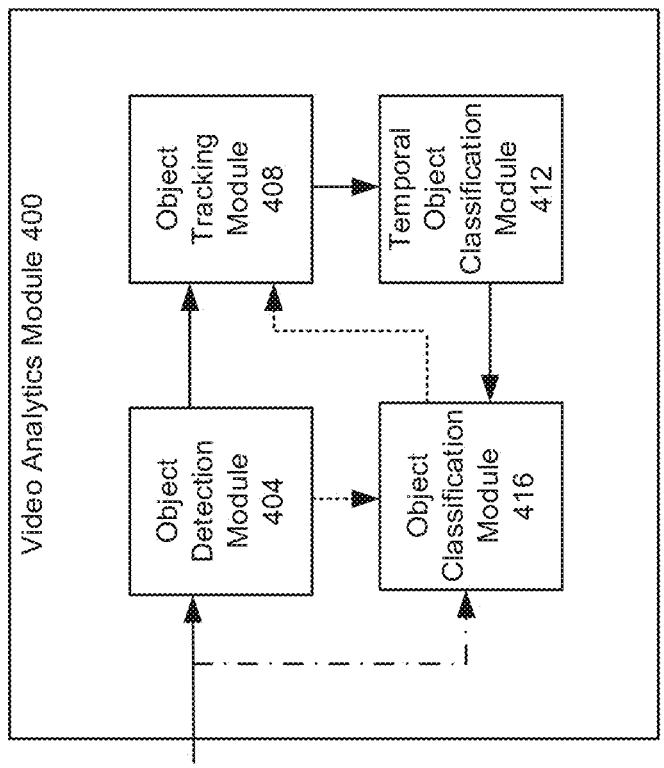
FIG. 3A illustrates a block diagram of a set of operational sub-modules of a video analytics module according to one example embodiment.

Referring now to FIG. 3A, therein illustrated is a block diagram of a set 400 of operational sub-modules of the video analytics module according to one example embodiment. The video analytics module 400 includes a number of modules for performing various tasks. For example, the video analytics module 400 includes an object detection module 404 for detecting objects appearing in the field of view of the video capturing device 108. The object detection module 404 may employ any known object detection method such as motion detection and blob detection, for example. The object detection module 404 may include the systems and use the detection methods described in commonly owned U.S. Pat. No. 7,627,171 entitled "Methods and Systems for Detecting Objects of Interest in Spatio-Temporal Signals," the entire contents of which are incorporated herein by reference.

The video analytics module 400 may also include an object tracking module 408 connected to the object detection module 404. The object tracking module 408 is operable to temporally associate instances of an object detected by the object detection module 404. The object tracking module 408 may include the systems and use the methods described in commonly owned U.S. Pat. No. 8,224,029 entitled "Object Matching for Tracking, Indexing, and Search," the entire contents of which are incorporated herein by reference. The object tracking module 408 generates metadata corresponding to visual objects it tracks. The metadata may correspond to signatures of the visual object representing the object's appearance or other features. The metadata may be transmitted to the metadata database 256 for storage.

The video analytics module 400 may also include a temporal object classification module 412 connected to the object tracking module 408. The temporal object classification module 412 is operable to classify an object according to its type (e.g., human, vehicle, animal) by considering the object's appearance over time. In other words, the object tracking module 408 tracks an object for multiple frames, and the temporal object classification module 412 determines the object's type based upon its appearance in the multiple frames. For example, gait analysis of the way a person walks can be useful to classify a person, or analysis of a person's legs can be useful to classify a bicycler. The temporal object classification module 412 may combine information regarding the trajectory of an object (e.g., whether the trajectory is smooth or chaotic, whether the object is moving or motionless) and the confidence of classifications made by an object classification module 416 (described in detail below) averaged over multiple frames. For example, classification confidence values determined by the object classification module 416 may be adjusted based on the smoothness of trajectory of the object. The temporal object classification module 412 may assign an object to an unknown class until the visual object is classified by the object classification module a sufficient number of times and a predetermined number of statistics have been gathered. In classifying an object, the temporal object classification module 412 may also take into account how long the object has been in the field of view. The temporal object classification module may make a final determination about the class of an object based on the information described above. The temporal object classification module 412 may also use a hysteresis approach for changing the class of an object. More specifically, a threshold may be set for transitioning the classification of an object from unknown to a definite class, and that threshold may be larger than a threshold for the opposite transition (e.g., from a human to unknown). The temporal object classification module 412 may generate metadata related to the class of an object, and the metadata may be stored in the metadata database 256. The temporal object classification module 412 may aggregate the classifications made by the object classification module 416.

The video analytics module 400 also includes the object classification module 416, preferably connected to the object detection module 404 directly or indirectly. In contrast to the temporal object classification module 412, the object classification module 416 may determine a visual object's type based upon a single instance (e.g., single image) of the object. The input to the object classification module 416 is preferably a sub-region of an image frame in which the visual object of interest is located rather than the entire image frame. A benefit of inputting a sub-region of the image frame to the object classification module 416 is that the whole scene need not be analyzed for classification, thereby requiring less processing power. Other preliminary modules, such as a heuristics-based modules to catch obvious classifications, can also be included to further simplify the complexity of the object classification module 416.

In an alternative arrangement, the object classification module 416 is placed after the object detection module 404 and before the object tracking module 408 so that object classification occurs before object tracking. In another alternative arrangement, the object detection, tracking, temporal classification, and classification modules 404, 408, 412 and 416 are interrelated as described in the above-referenced.

Figure 3B:
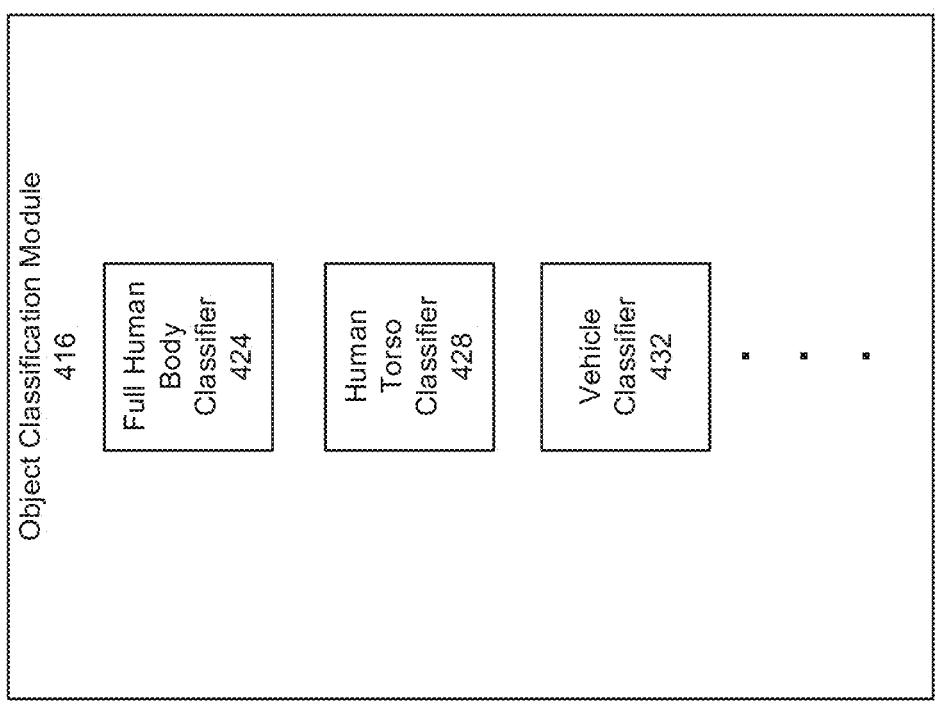
FIG. 3B illustrates a plurality of object classifiers of an object classification module according to one example embodiment.

The object classification module 416 includes a number of object classifiers as depicted in the block diagram of FIG. 3B. For example, the object classification module 416 may include a full human body classifier 424 that determines whether an image of a detected object corresponds to a full human body, a human torso classifier 428 that determines whether an image of a detected object corresponds to a human torso, and a vehicle classifier 432 that determines whether an image of a detected object corresponds to a vehicle. The object classification module 416 may include any number of different classifiers, and, as described in more detail below, a user may create new classes of objects for the object classification module 416 even when the camera system is deployed and functioning. In other words, the object classification module 416 is field trainable.

The object classifiers are operable to classify an object based upon the object's features (e.g., appearance characteristics). For example, the full human body classifier 424 receives data (i.e., an input pattern X) corresponding to an object's features and determines whether the object corresponds to a full human body or not. After the object classification module 416 classifies an object, metadata representing the class of the object and the features of the object may be stored in the metadata database 256.

Features that can be used by the object classification module 416 will now be described in greater detail. A training algorithm, described below, chooses a subset of features $\hat{F}=\{f_{k1}, f_{k2}, \ldots f_{km}\}$ from a set of features $F=\{f_1, f_2, \ldots, f_n\}$. The input pattern X is made up of the elements of $\hat{F}$. The elements of $\hat{F}$ may be viewed as some transformation of an image region R of an object. Thus, X may take on the following form:

$$X = \begin{pmatrix} \hat{f}_1 = f_{k1}(R) \\ \hat{f}_2 = f_{k2}(R) \\ \vdots \\ \hat{f}_m = f_{km}(R) \end{pmatrix}$$

The features $\hat{f}_1, \hat{f}_2, \ldots, \hat{f}_m$ of an object may correspond to a number of appearance characteristics such as, but not limited to, aspect ratio, color, edge orientations, and normalized saturation. Moreover, the features $\hat{f}_1, \hat{f}_2, \ldots, \hat{f}_m$ may represent feature vectors (e.g., histograms in which the histogram bins correspond to vector components) of the appearance characteristics and may be used by one or more object classifiers to determine the object's class (e.g., type). For example, histograms of the edge orientations of an object may be constructed for different regions (e.g., subwindows) of the object's image. In other words, an image of an object may be divided into subwindows, and edge orientations may be calculated for each pixel of the subwindows. The edge orientation of a pixel may be derived using a steerable filter (e.g., using a Gaussian derivative filter in multiple directions). Using a steerable filter allows dominant directions to be assigned to the pixels of a subwindow, and allows a histogram of the directions to be constructed for the subwindow. For example, for a given pixel, a steerable filter may be used in multiple directions to generate multiple responses, and the direction corresponding to the maximum directional derivative response is assigned as the direction of the pixel.

The classification problem for one of the object classifiers may be defined generally by a classifier function $\Gamma(X)$, in which a visual object represented by the input pattern X is declared a member of the object class when $\Gamma(X)>0$ or as a non-member of the object class when $\Gamma(X)<0$. Generally the classifier function $\Gamma(X)$ is parameterized with a set of parameters and the input pattern X is composed of the features described above. A specific classifier $\Gamma_c(X)$ is trained for each object class of interest. The multi-class classification model represented by the object classification module 416 of FIG. 3A may be mathematically defined as follows:

$$\Omega=\{\omega_1, \omega_2, \ldots, \omega_c\}$$

$$\omega=\omega_c:(\Gamma_c(X)>0 \text{ and } \Gamma_c(X)>\Gamma_u(X) \forall u \in \{1, 2, \ldots, C\}, u \neq c\},$$

where ω represents an object class, and Ω represents the set of all object classes.

A classifier function R(X) for a given visual object class may be built by defining rules (e.g., size and aspect ratio of visual objects). The classifier function may be further trained by applying machine learning using training data. As is known in the art, training a classifier seeks to further refine the rules of that classifier so that it may more accurately classify a given visual object. The training data may include positive training examples and/or negative training examples. A positive training example refers to an instance of a visual object that has been confirmed as belonging to a specific class of objects. The positive training example serves to train a classifier to refines its rules to more accurately positively classify a given visual object as falling within the class of that positive training example. A negative training example refers to an instance of a visual object or other visual representation that does not belong to a specific class of objects. The negative training example may be an example of a visual object that has been misclassified as belonging to a specific class of objects by a classifier. The negative training example serves to train a classifier.

The machine learning for training the object classifier may be any appropriate machine learning technique known in the art, such as but not limited to, convolution neural networks, support vector machines, decision trees, random forests, cascade classifiers.

Training of an object classifier may be supervised. In supervised training, the positive training examples and/or negative training examples have been confirmed by a human user. For example, among a large batch of images, one or more human users individually inspects and labels each image as representing an visual object belonging to a class (e.g. person, vehicle, animal) or as not containing a visual object.

Training of an object classifier may also be unsupervised. In unsupervised training, a base classifier is used to initially classify one or more visual objects, such as objects detected by the object detection module 404. The visual object and the result of the classification determined by the base classifier (e.g. a positive determination that the visual object belongs to a specific object class) may be used as a positive training example for further training of the base classifier. Image data in which objects have not been detected may also be used as negative training examples for training the object classifier. In unsupervised training, the image data used as positive training examples or as negative training examples are not inspected by a human user.

A base classifier herein refers to an object classifier that has been configured through definition of rules and/or trained through application of machine learning to perform a certain degree of object classification but that can be further optimized through yet further training using computer-implemented visual machine language.

Figure 4:
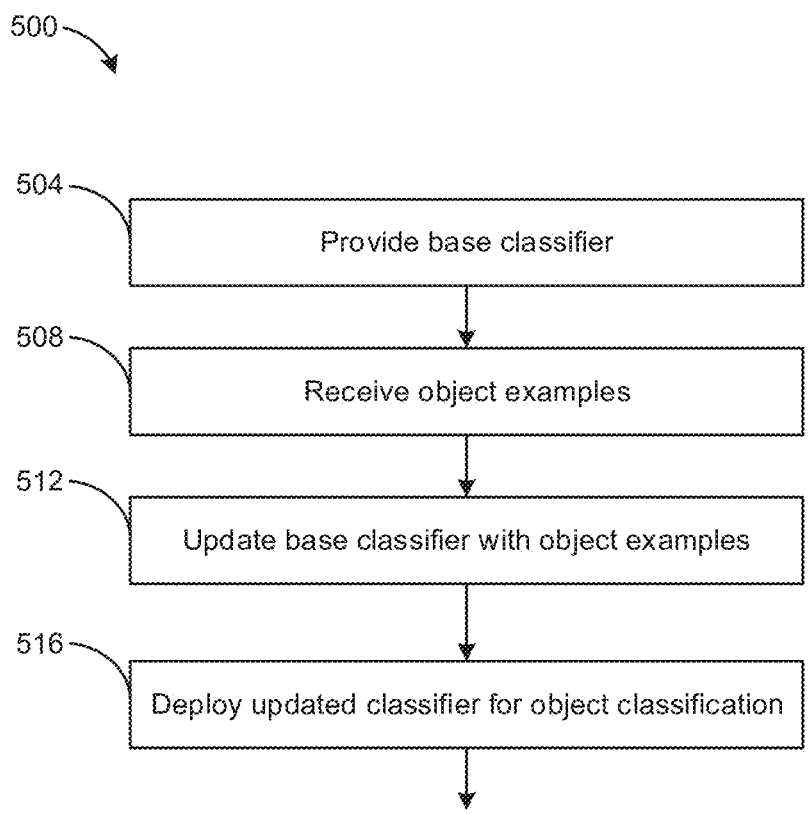
FIG. 4 illustrates a flowchart of a method known in the art for further training of a base classifier.

Referring now to FIG. 4, therein illustrated is a flowchart of a method 500 for further training of a base classifier. It will be understood that while method 500 is illustrated for training of a single base classifier, the method 500 may be applied for training a plurality of base classifiers in parallel. For example, and as described elsewhere herein, an object classification module 416 may include a plurality of object classifier, each classifier being operable to determine whether a visual object belongs to a specific type of class. Accordingly, the plurality of object classifiers of the object classification module 416 may be trained together based on training examples provided to it. For example, a training example that is a foreground visual object of a particular class may be used as a positive training example for a classifier that pertains to the same class.

At 504, a base classifier is provided. The base classifier may be any object classifier that can be further trained through application of machine learning using visual training examples.

At 508, one or more training examples may be received. The training examples may be positive training examples and/or negative training examples, which may be prepared automatically or under supervised conditions.

At 512, the base classifier is further trained by applying machine learning to the base classifier using the training examples received at 508 as inputs.

It will be understood that in some embodiments steps 508 and 512 are repeated such that the updating of the base classifier follows an iterative process. That is, a first batch of a plurality of training examples may be applied for training the base classifier by machine learning in a first iteration. A second batch of a plurality of training examples may be further applied for further training of the classifier by machine learning in a subsequent second iteration.

At 516, the base classifier as trained after steps 508 and 512 is deployed in the field for classification of foreground visual objects.

In some examples, training of the base classifier from steps 508 and 512 may be carried out prior to deployment of the trained classifier at 516.

In other examples, the training of a base classifier at steps 508 and 512 may be performed while the object classifier is already deployed in the field. The training examples may be visual representations of real-world objects present in the field of view of a video capture device when that device is deployed in the field. For example, the base classifier may be initially deployed and gradually trained during deployment from foreground visual objects detected from field 508.

Visual object used as training examples may be identified as belonging to a class in a supervised manner (e.g. visually inspected by a human user) or in an unsupervised manner (e.g. classified by a computer-implemented object classifier).

Figure 5:
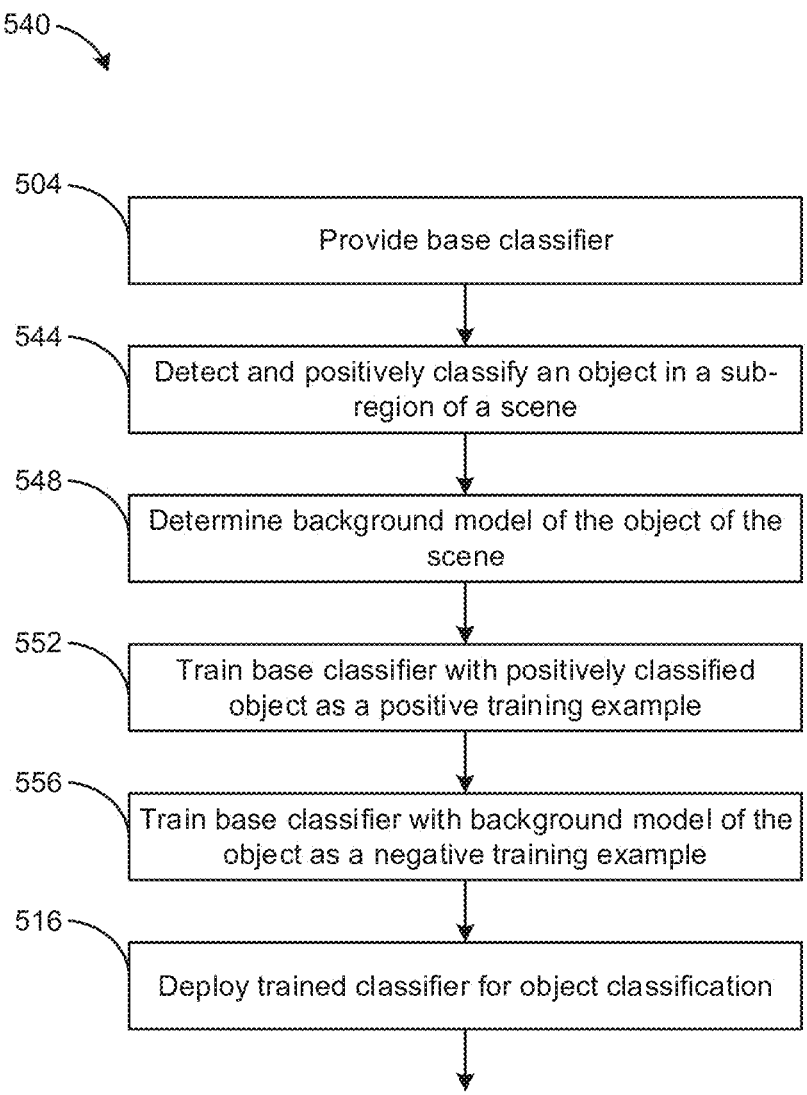
FIG. 5 illustrates a flowchart of an improved computer-implemented method for further training of a base classifier according to one example embodiment.

Referring now to FIG. 5, therein illustrated is a flowchart of an improved computer-implemented method 540 for further training of a base classifier according to one example embodiment. It will be understood that while method 540 is illustrated for training of a single base classifier, the method 540 may also be applied for training a plurality of base classifiers in parallel. For example, and as described elsewhere herein, an object classification module 416 may include a plurality of object classifiers, each classifier being operable to determine whether a visual object belongs to a specific class. Accordingly, the plurality of object classifiers of the object classification module 416 may be trained together based on training examples provided to it. For example, a training example that is a visual object of a particular class may be used as a positive training example for a classifier that pertains to the same class.

At 504, a base classifier is provided. The base classifier may be any object classifier that can be further optimized through application of machine learning using visual object training examples.

At 544, a foreground visual object is detected within image data representing a scene. A scene herein refers to the visual representation captured within the field of view of a video capture device over an interval of time. The video capture device is static over this interval of time such that its field of view remains unchanged. Accordingly, the scene that is captured over the interval of time also remains unchanged, but objects (e.g. humans, vehicles, other objects) within the scene may be changing over that interval of time. The visual representation of the scene may be the image frames of the image data generated by the video capture device over the interval of time.

The foreground visual object may also be positively classified by a human operator or by a computer-implemented module as belonging to a specific class. The foreground visual object that is detected is located within a sub-region of the scene. For example, the sub-region of the scene may correspond to a portion of an image frame of the image data in which the detected foreground visual object is located. For example, the sub-region of the scene may corresponds to the sub-region of the image frame that is delimited by the bounding box drawn by the object detection module 404 for visually identifying the detected foreground visual object.

At 548, a background model of the detected visual object is determined. A background model is a visual representation of the scene or a sub-region thereof but with any foreground visual object being absent from the scene or the sub-region. The background model of the detected foreground visual object is the background model of the sub-region of the scene where the foreground visual object that is detected is located.

For example, where the foreground visual object detected at 544 is a human and the sub-region of the scene corresponds to an area of a room where that human is located, the background model of that sub-region represents that area of the room without that human, or any other human, being present.

For example, where the foreground visual objected detected at 544 is a vehicle and the sub-region of the scene corresponds to a part of a parking lot where that vehicle is located, the background model of that sub-region represents that part of the parking lot without that vehicle, or any other vehicle, being present.

At 552, the base classifier is optionally further trained by applying machine learning to the base classifier using the foreground visual object detected at 544 as a positive training example.

At 556, the base classifier is further trained by applying machine learning to the base classifier using the background model of the detected foreground visual object as a negative training example.

Steps 544 to 556 may be repeated for a plurality of visual objects that are detected and/or classified. For each visual object detected at 544, a background model that is specific to the sub-region of a scene where that visual object is located is determined at 548 and applied for training the base classifier at 556.

In other examples, the base classifier may be trained by applying machine learning to the base classifier using a batch of a plurality of training examples. This batch includes a plurality of background models of foreground visual object detected in the sub-regions of a plurality of different scenes.

It will be understood that in some embodiments steps 544 and 556 are repeated such that the updating of the base classifier follows an iterative process. That is, a first batch of one or more training examples may be applied for training the base classifier by machine learning in a first iteration. A second batch of a plurality of training examples may be further applied for further training the base classifier as trained after the first iteration by machine learning in a subsequent second iteration.

At 516, the base classifier as trained after step 556, and optionally step 552, is deployed in the field for classification of additional foreground visual objects.

As described elsewhere herein, training of the base classifier may be carried out prior to deployment of the trained classifier or while the object classifier is already deployed in the field.

Figure 6A:
FIG. 6A to 6F are sub-regions of scenes with detected foreground visual objects and their corresponding background models.
Figure 6B:

FIGS. 6A to 6F show foreground visual objects detected in sub-regions of scenes and their corresponding background model. For example, FIG. 6A shows a person walking on a segment of a sidewalk. The person walking is the foreground visual object that is detected. FIG. 6B shows the background model of the visual object of FIG. 6A. It will be appreciated that the background model shows the same segment of the sidewalk without the person walking or any other foreground visual object being present.

Figure 6C:
Figure 6D:
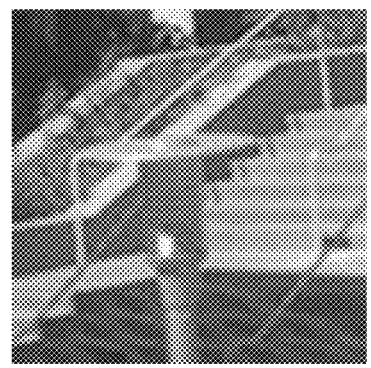

FIG. 6C shows a person descending a flight of stairs. The person is the foreground visual object that is detected. FIG. 6D shows the background model of the foreground visual object of FIG. 6C. It will be appreciated that the background model shows the same flight of the stairs without the person or any other foreground visual object being present.

Figure 6E:
Figure 6F:

FIG. 6E shows a vehicle driving over a segment of road. The vehicle is the foreground visual object that is detected. FIG. 6F shows the background model of the foreground visual object of FIG. 6E. It will be appreciated that the background model shows the same segment of road without the vehicle or any other foreground visual object being present.

According to various example embodiments, a background model of a detected visual object is determined from a historical image frame. A foreground visual object is detected within a given sub-region of a current image frame of a sequence of image frames of image data that form video captured by the video capture device. A historical image frame is a previous image frame in the sequence of image frames in which the foreground visual object and any other foreground visual object are absent from that previous image frame. In this case, the current image frame and the historical image frame represent the same scene. That is, the video capture device is static (i.e. unmoved) between the time of the historical image frame and the current image frame so that the video capture device is capturing the same scene. A given sub-region of the historical image frame that corresponds to the sub-region of the current image frame where the foreground visual object is located is cropped from the historical image frame. The historical image frame cropped in this way is the background model of detected foreground visual object. This cropped historical image frame is provided at 556 as a negative training example for further training of the base classifier.

According to various example embodiments, a complete background model of the entire scene may be constructed initially. The background model of a given sub-region of the scene can then be extracted from the complete background model.

For example in a less busy scene, such as one where there is a low occurrence of foreground visual objects, a single historical image frame that is entirely free of foreground objects may be used as the complete background model.

In a busier scene, there may always be at least one foreground visual object at any time within the scene. For such scenes, the complete background model may be constructed by aggregating different sub-regions from a plurality of historical image frames to form the complete background model.

According to one example, a plurality of historical image frames are selected. Each of these historical image frames contains at least one sub-region of the image frame that is free of any foreground objects.

The coordinates of one or more sub-regions that are free of any foreground objects of each selected historical image frame is determined. These sub-regions may be cropped from their respective historical image frame.

The sub-regions, as cropped from the plurality of historical images, are then aggregated to form an aggregated image. An aggregated image that represents the entire scene can be obtained by appropriately selecting the plurality of historical image frames such that the sub-regions of these frames that are free of any foreground objects collectively cover the entire scene. Accordingly, the aggregated image forms a complete background model of the scene. For example, the image sub-regions, as cropped from the plurality of historical images, may be stitched together to form the aggregated image according to methods of stitching known in the art.

Accordingly, after detecting a foreground visual object within a given sub-region of a scene, the background model of that sub-region can be obtained by cropping a sub-region of the aggregated image that corresponds to the given sub-region where the visual object is detected.

Figure 7A:
FIG. 7A is a first full historical image frame representing an example of a scene.

FIG. 7A shows a first full historical image frame representing an example scene that is a plaza. It will be appreciated that the first sub-region 700, covering part of the dining area and the grassy area, is free of any foreground visual objects. Accordingly, the first sub-region 700 may be used as one of the sub-regions to be aggregated for forming the complete background model. However, the second sub-region 708, covering the steps, has a person located therein. Because this second sub-region 708 in the first full historical image frame includes a foreground visual object, it cannot be used for building the complete background model.

Figure 7B:
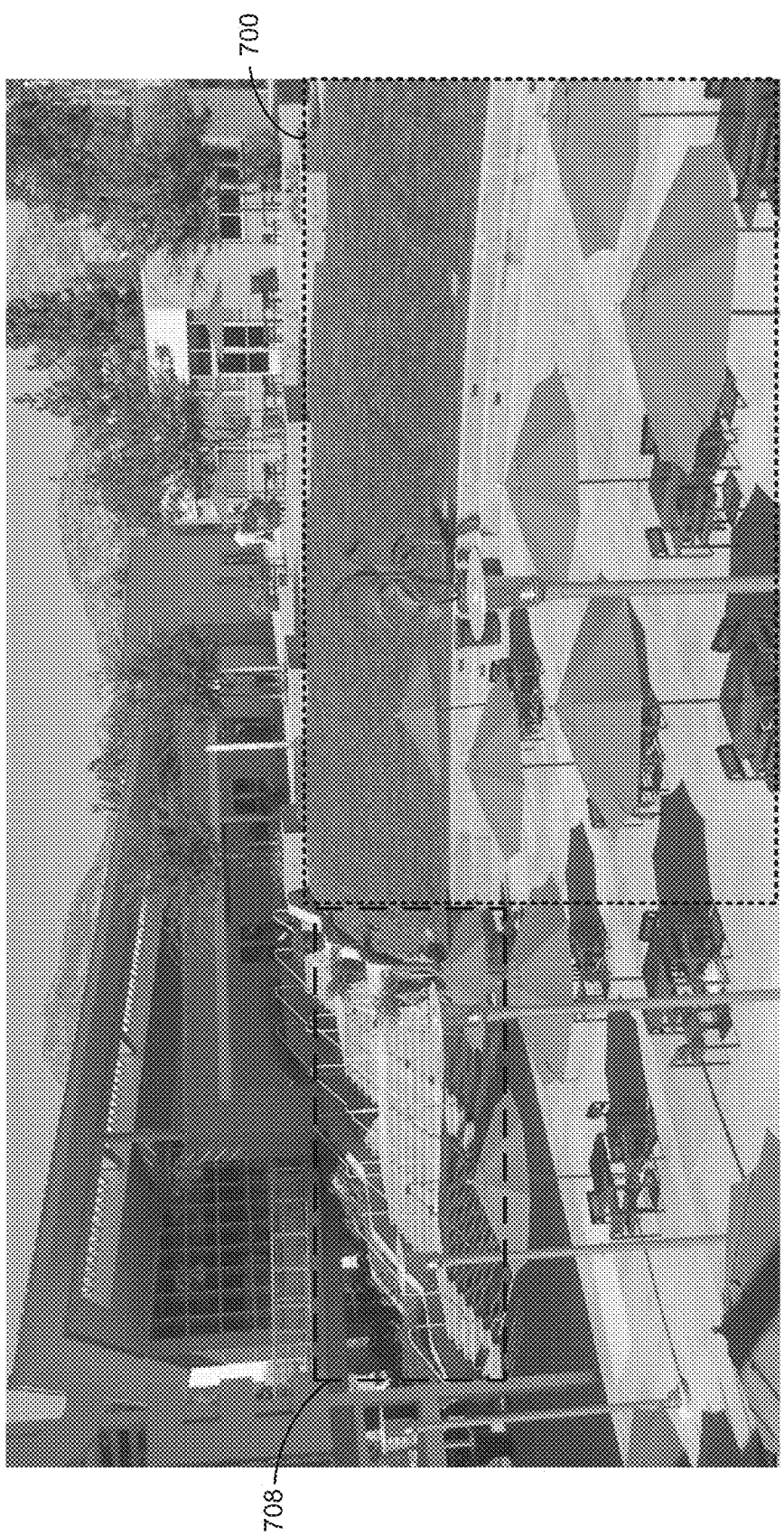
FIG. 7B is a second full historical image frame representing an example of the scene.

FIG. 7B shows a second full historical image frame representing the same scene of the plaza. The second full historical image frame was captured at a later point in time than the first full historical image. It will be appreciated that the second sub-region 708 in the second full historical image frame is free of a foreground visual object. The person that was in the steps in the first full historical image frame has now completely descended steps. Accordingly, this second sub-region 708 in the second full historical image frame may be used as one of the sub-regions to be aggregated for forming the complete background model. Other sub-regions of the scene that are appropriate for forming the complete background model may be determined in the same way.

Figure 8:
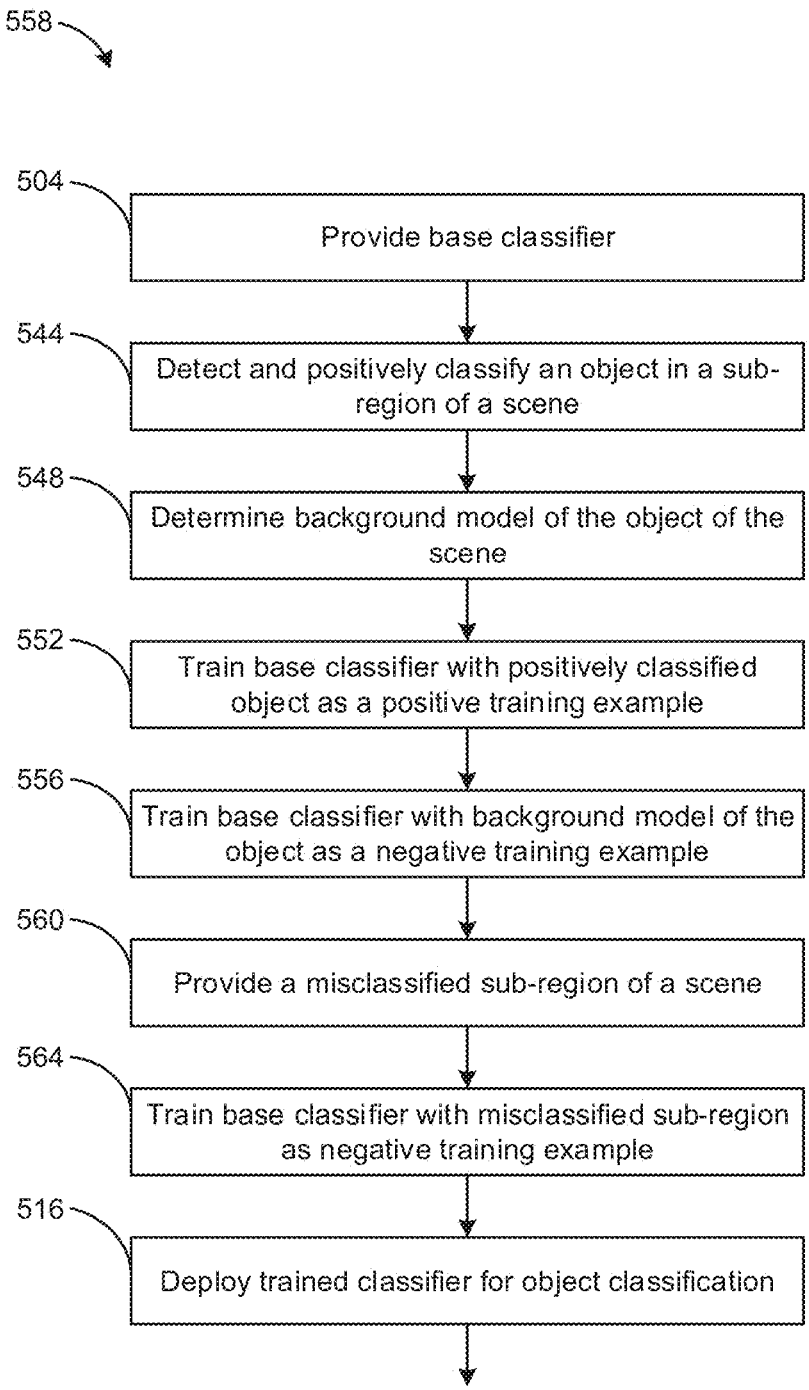
FIG. 8 illustrates a flowchart of an improved computer-implemented method for further training of a base classifier according to an alternative example embodiment.

Referring now to FIG. 8, therein illustrated is a flowchart of an improved computer-implemented method 558 for further training of a base classifier according to an alternative example embodiment. Alternative example method 558 includes the same steps as method 540 but also includes additional steps 560 and 564.

At 560, a misclassified sub-region of a scene is provided. A misclassified sub-region of a scene refers to a sub-region in which an object classifier has erroneously classified the sub-region as containing an object as belonging to a particular class when the sub-region does not actually contain any objects of that class.

A misclassified sub-region may be determined in a supervised environment in which objects classified by an object classifier are reviewed by a human who identifies any misclassifications made by the object classifier.

A misclassified sub-region may be determined in a partly supervised or wholly unsupervised environment. In one example, sub-regions of image frames in which objects are absent may be fed to an object classifier. Any classification by the object classifier that the sub-region includes an object belonging to a particular class (other than being the background) will be erroneous and is identified as a misclassified sub-region.

The scene in which a misclassified sub-region is identified may be the same scene as the scene in which a foreground visual object is detected at 544. Alternatively, the scene of the misclassified sub-region may be different from the scene in which the foreground visual object is detected.

At 564, the base classifier is further trained by applying machine learning to the base classifier using the misclassified sub-region as a negative training example.

At 516, the classifier as trained from the background model of the detected visual object, the misclassified sub-region, and, optionally, the detected visual object is deployed for classification of further detected visual objects.

Figure 9:
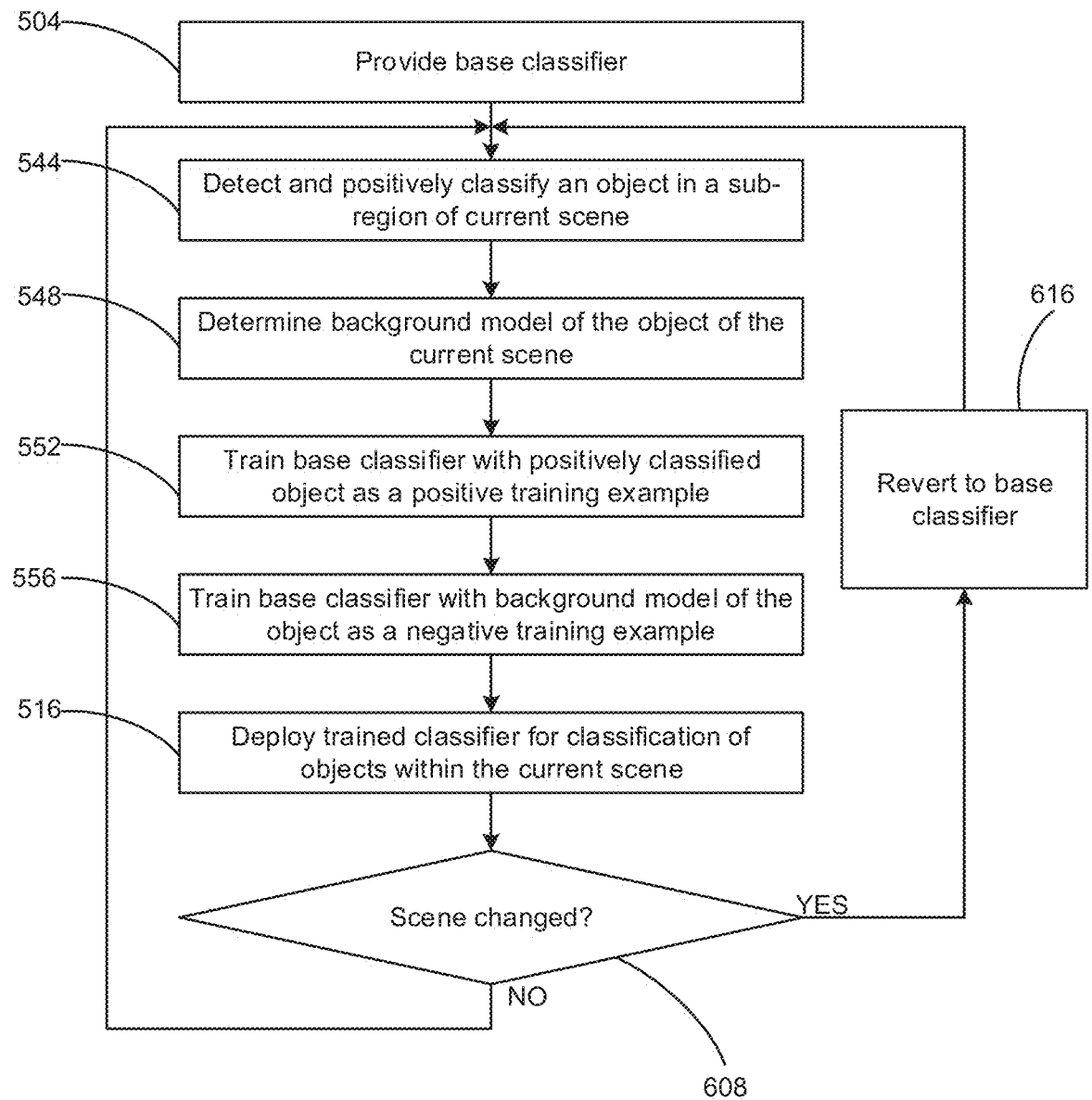
FIG. 9 illustrates a flowchart of an improved computer-implemented method for scene-specific training of a base classifier according to one example embodiment.

Referring now to FIG. 9, therein illustrated is a flowchart of an improved computer-implemented method 600 for scene-specific training of a base classifier according to one example embodiment. It will be understood that numerous steps of example method 600 are similar or the same as steps of example method 540 and that the description provided with respect to example method 540 is also applicable to example method 600. It will be understood that scene-specific method 600 may also be applied according to the alternative example method 560.

At 504, a base classifier is provided.

Subsequent to providing the base classifier, the training of the base classifier begins. The base classifier is trained specifically for a current real-world scene. The current scene may correspond to the field of view of a specific camera that is positioned at a specific location and oriented in a specific direction.

At 544, a foreground visual object is detected within image data representing the current scene.

At 548, a background model of the detected object is determined.

At 552, the base classifier is optionally trained by applying machine learning to the base classifier using the foreground visual objects detected from the current scene at 544 as a positive training example.

At 556, the base classifier is trained by applying machine learning to the base classifier using the background model of the foreground visual object determined at 548 as a negative training example.

At 516, the base classifier as trained based on foreground visual objects and/or background models of the current scene is deployed for classifying objects found in the current scene.

It will be understood that as long as the current scene remains unchanged steps 544 to 556 may be repeated so as to further train the base classifier by applying machine learning using a plurality of training examples found in the current scene. As described elsewhere herein, steps 544 to 556 may be repeated such that the updating of the base classifier follows an iterative process.

At 608, it is determined whether the current scene has changed. Such a change in the current scene may occur due to a change in the location of the camera that was capturing the scene. Such a change may also occur due to a change in the orientation of the camera that was capturing the scene. Such a change may further also occur due to a change in a setting of the camera that was capturing the scene, such as a significant change in the zoom applied by the camera or an operational mode of the camera (e.g. switching from normal light to low light mode).

If the scene remains unchanged at 608, the method 600 may return to 544 to detect and classify additional visual objects within the scene. Alternatively, the method 600 may return to 516 to continuing deploying the object classifier as trained from steps 544 to 556 for the current scene.

If the scene is changed at 608, the method proceeds to step 616 to at least partially revert towards the base classifier. In some examples, the object classifier currently being deployed at 516 is completely reverted back to the base classifier when there is a change in the scene.

After reverting back towards the base classifier at step 616, the new scene that results from the change in the scene may be set as the current scene. The method 600 may then return to 544 to detect and classify foreground visual objects found in the "new" current scene. These objects and/or background models corresponding to those objects may be applied for updating the base classifier after the reverting of step 616.

It will be appreciated that reverting to the base classifier may be useful in situations where the characteristics of an initial scene and a subsequent scene are significantly different such that the training of the base classifier according to characteristics of the initial scene are not applicable to the subsequent scene. Reverting back to the base classifier allows the classifier to be retrained specifically for characteristics of the subsequent scene.

Experiment

According to one experiment, the performance of a base classifier (a specific architecture of deep convolution neural network known as "AlexNet" described in Alex Krizhevsky, Ilya Sutskever, Geoffrey Hinton, "ImageNet Classification with deep convolution neural networks", NIPS 2012) was evaluated when trained using different sets of training examples.

Training examples were obtained from the VIRAT dataset (http://www.viratdata.org). This dataset includes more than 300 videos from various static cameras. Visual objects of the human class and visual objects of the vehicle class were extracted from the VIRAT dataset and used as a first set of training examples. A background model was determined for each visual object used as a training example. These background models are used as a second set of training examples.

In addition to the human class and vehicle class, training examples belonging to background class were also extracted from the VIRAT dataset. To generate the background class training examples, image samples that do not contain a foreground visual object of the human class or a foreground visual object of the vehicle class were prepared. Each image sample is a cropped portion of an image frame of the videos found in the VIRAT dataset. A simple object classifier, such as one that is not based on neural network classifier, is used to classify these image samples. A misclassification occurs when the simple classifier classifies any one of the image samples as containing a visual object that falls within the human class or the vehicle class. These misclassified image samples are included in a third set of training examples.

The AlexNet classifier is provided as a base classifier that is to be trained by the training examples extracted from the VIRAT dataset. The positive and negative training examples are applied to train the base classifier using the Caffe deep learning framework from the Berkeley Vision and Learning Center (available at: caffe.berkeleyvision.org). The updating of the base classifier was performed on a Tesla K80 GPU.

In a first part of the experiment, the base classifier was trained by applying the first set of examples as positive training examples (100 positive training examples) and by applying the second set of training examples as negative training examples (100 negative training examples). This training of the base classifier produced a first trained test classifier.

In a second part of the experiment, the base classifier was trained by applying the first set of examples as positive training examples (100 positive training examples) and by applying the third set of training examples as negative training examples (100 negative training examples). This training of the base classifier produced a second trained test classifier.

In a third part of the experiment, the base classifier was trained by applying the first set of examples as positive training examples (100 positive training examples) and a mixture of the second set of training examples and of the third set of training examples as negative training examples. More precisely 50 training examples from the second set and 50 training examples from the third set were applied as negative training examples for training the base classifier. This training of the base classifier produced a third trained test classifier.

Each of the first trained test classifier, the second trained test classifier and the third trained test classifier were deployed for object classification on a test set of videos from an in-house video dataset. The error rate when deploying each of the classifiers was measured. An error is considered to have been made when a visual object is misclassified or when a background image (e.g. no foreground visual object present) is classified as being a visual object that is in the human class or vehicle class.

Table 1 is a confusion matrix showing the performance of the first trained test classifier when deployed for classifying foreground visual objects contained in the test set of videos.

TABLE 1

| | | CLASSIFIED (%) | | |
|---|---|---|---|---|
| | | Human | Vehicle | Background |
| ACTUAL | Human | 36.26 | 9.58 | 3.26 |
| | Vehicle | 0.94 | 26.78 | 0.29 |
| | Background | 0.14 | 0.15 | 22.60 |

Table 2 is a confusion matrix showing the performance of the second trained test classifier when deployed for classifying foreground visual objects contained in the test set of videos.

TABLE 2

| | | CLASSIFIED (%) | | |
|---|---|---|---|---|
| | | Human | Vehicle | Background |
| ACTUAL | Human | 38.80 | 8.56 | 1.74 |
| | Vehicle | 4.49 | 23.36 | 0.16 |
| | Background | 0.32 | 0.14 | 22.42 |

Table 3 is a confusion matrix showing the performance of the third trained test classifier when deployed for classifying foreground visual objects contained in the test set of videos.

TABLE 3

| | | CLASSIFIED (%) | | |
| --- | --- | --- | --- | --- |
| | | Human | Vehicle | Background |
| ACTUAL | Human | 43.26 | 4.72 | 1.11 |
| | Vehicle | 3.49 | 24.39 | 0.14 |
| | Background | 0.34 | 0.12 | 22.43 |

The error rate of the first trained test classifier is 14.36%, the error rate of the second trained test classifier is 15.42% and the error of the third trained test classifier is 9.92%.

It will be appreciated that use of background models of foreground visual objects for training the base classifier (the first trained test classifier and the third trained test classifier) exhibited lower error rates over the second trained test classifier in which background models were not used as training examples. The lower error rates is an indicator of improved performance. More significantly, it will be appreciated that using a combination of background models of foreground visual objects and background class objects together as negative training examples exhibit significantly improved performance (35.6% lower error rate versus the second trained test classifier).

Without being tied to a particular theory, the use of background models of detected visual objects as negative training examples for training a classifier may reduce the incidences of the classifier misclassifying objects of a scene that otherwise form part the background of the scene.

Referring back to FIG. 6C, it will be appreciated the sub-region of the scene shown in the image includes the person and a lamppost. The person is a foreground visual object and the lamppost forms part of the background of the scene. However, when this sub-region is used as a positive training example, the base classifier may be caused to be trained to recognize the lamppost as a foreground visual object of the person class. For example, if this sub-region of the scene corresponds to a real-life location that will often have an object of interest (e.g. a frequently-used hallway, pathway or road), the lamppost may appear in multiple sub-regions that are each used as positive training examples. This may increase the likelihood that the classifier will be trained to recognize the lamppost as an instance of an object of the person class. The use of the background model of the sub-region as a negative training example may at least partially counteract this effect by training the classifier that the lamppost forms part of the background of the scene.

Similarly, by training a classifier using the background model shown in FIG. 6F, the classifier is trained to recognize the vertical beam as forming part of the background, thereby reducing the possibility of classifying the vertical beam or objects similar to it as belonging to a human class or vehicle class.

More generally, and without being tied to a particular theory, training a classifier using a background model leads a classifier to be trained to correctly recognize real-life objects that form part of the background of a scene as being background objects. For example, in a sub-region of a scene where a foreground visual object will often be detected, the use of a background model, the use of the background model of that sub-region as a negative training example may reduce the likelihood of the classifier being train to erroneously classify objects that form part of the background as foreground visual objects belonging to a particular class.

While the above description provides examples of the embodiments, it will be appreciated that some features and/or functions of the described embodiments are susceptible to modification without departing from the spirit and principles of operation of the described embodiments. Accordingly, what has been described above has been intended to be illustrated non-limiting and it will be understood by persons skilled in the art that other variants and modifications may be made without departing from the scope of the invention as defined in the claims appended hereto.

The invention claimed is:

1. A method for training a computer-implemented object classifier, the method comprising:
   detecting a foreground visual object within a sub-region of a scene within a field of view of a video capture device;
   determining a background model of the sub-region of the scene, the background model representing the sub-region when any foreground visual object is absent therefrom; and
   training the object classifier by computer-implemented machine learning using the background model of the sub-region as a first negative training example,
   wherein the object classifier is trained specifically for a current scene, and wherein upon the current scene being changed to a new scene:
      reverting to the object classifier without the training specific to the current scene; and
      training the object classifier by machine learning using background models from the new scene.

2. The method of claim 1, further comprising training the object classifier by machine learning using the detected foreground visual object as a positive training example.

3. The method of claim 1, wherein determining the background model of the sub-region of the scene comprises:
   selecting a historical image frame captured when any foreground object is absent from a sub-region of the historical image frame corresponding to the sub-region of the scene; and
   cropping from the historical image frame the sub-region corresponding to the sub-region of the scene, the cropped image frame being the background model of the sub-region of the scene.

4. The method of claim 1, wherein determining the background model of the sub-region of the scene comprises:
   determining, within each of a plurality of historical image frames, one or more sub-regions being free of any foreground objects;
   aggregating the one or more sub-regions from the plurality of historical image frames to form a complete background image representing the entire scene; and
   cropping from the complete background image a sub-region corresponding to the sub-region of the scene, the cropped complete background image being the background model of the sub-region of the scene.

5. The method of claim 4, wherein aggregating the one or more sub-regions from the plurality of historical image frames comprises stitching the one or more sub-regions to form an image representing the whole scene.

6. The method of claim 1, wherein the object classifier is prepared in part using supervised learning.

7. The method of claim 1, wherein the computer-implemented machine learning is a convolutional neural network.

8. A computer-implemented object classifier for object classification trained according to the method of claim 1.

9. The method of claim 1, further comprising training the object classifier by computer-implemented machine learning using a misclassified sub-region of a scene as a negative training example.

10. A system for training a computer-implemented object classifier, the system comprising:
a processor;
a computer-readable storage device storing program instructions that, when executed by the processor, cause the system to perform operations comprising:
detecting a foreground visual object within a sub-region of a scene within a field of view of a video capture device;
determining a background model of the sub-region of the scene, the background model representing the sub-region when any foreground visual object is absent therefrom;
training the object classifier by computer-implemented machine learning using the background model of the sub-region as a first negative training example, wherein the object classifier is trained specifically for a current scene;
upon the current scene being changed to a new scene, reverting to the object classifier without the training specific to the current scene; and
training the object classifier by machine learning using background models from the new scene.

11. The system of claim 10, wherein the operations further comprise training the object classifier by machine learning using the detected foreground visual object as a positive training example.

12. The system of claim 10, wherein determining the background model of the sub-region of the scene comprises:
selecting a historical image frame captured when any foreground object is absent from a sub-region of the historical image frame corresponding to the sub-region of the scene;
cropping from the historical image frame the sub-region corresponding to the sub-region of the scene, the cropped image frame being the background model of the sub-region of the scene.

13. The system of claim 10, wherein determining the background model of the sub-region of the scene comprises:
determining, within each of a plurality of historical image frames, one or more sub-regions being free of any foreground objects;
aggregating the one or more sub-regions from the plurality of historical image frames to form a complete background image representing the entire scene; and
cropping from the complete background image a sub-region corresponding to the sub-region of the scene, the cropped complete background image being the background model of the sub-region of the scene.

14. The system of claim 13, wherein aggregating the one or more sub-regions from the plurality of historical image frames comprises stitching the one or more sub-regions to form an image representing the whole scene.

15. The system of claim 10, wherein the object classifier is prepared in part using supervised learning.

16. The system of claim 10, wherein the computer-implemented machine learning is a convolutional neural network.

17. The system of claim 10, wherein the operations further comprise training the object classifier by computer-implemented machine learning using a misclassified sub-region of a scene as a negative training example.

* * * * *